United States Patent [19]

Davidson et al.

[11] 4,176,815

[45] Dec. 4, 1979

[54] VARIABLE SPRING HANGER ASSEMBLY

[75] Inventors: Thomas Davidson, Centerport, N.Y.; Charles Cunneen, Morganville, N.J.

[73] Assignee: F & S Manufacturing Corporation, Brooklyn, N.Y.

[21] Appl. No.: 831,587

[22] Filed: Sep. 8, 1977

[51] Int. Cl.$^2$ ............................................... F16L 3/00
[52] U.S. Cl. ..................................... 248/589; 29/452; 248/59; 403/349
[58] Field of Search ................... 248/54 R, 54 CS, 59, 248/18; 403/349; 85/5 P; 29/452, 446; 267/178, 170

[56] References Cited

U.S. PATENT DOCUMENTS

| | | | |
|---|---|---|---|
| 1,703,397 | 2/1929 | Kirk et al. | 248/54 R X |
| 2,157,153 | 5/1939 | Troche | 403/349 X |
| 2,417,154 | 3/1947 | Dath | 248/54 R |
| 2,729,417 | 1/1956 | Maynard | 248/54 R X |
| 2,936,142 | 5/1960 | Sherburne | 248/54 R |
| 2,996,339 | 8/1961 | Loretan | 308/159 |
| 3,005,667 | 10/1961 | Loretan | 308/159 |
| 3,102,706 | 9/1963 | Goldsmith | 248/54 R |
| 4,083,522 | 4/1978 | Vandersip | 248/59 X |

FOREIGN PATENT DOCUMENTS

| | | | |
|---|---|---|---|
| 83446 | 4/1921 | Austria | 403/349 |
| 1279548 | 11/1961 | France | 267/178 |
| 697987 | 10/1953 | United Kingdom | 248/54 R |

*Primary Examiner*—Rodney H. Bonck
*Attorney, Agent, or Firm*—Wolder, Gross & Yavner

[57] ABSTRACT

A spring hanger assembly for supporting a portion of a pipe line includes a hollow housing having mounted therein a movable upper piston plate and a stationary lower plate, with a coiled compression spring disposed between said plates and urging said upper piston plate in a vertical upward direction. Adjustable hanger means are carried by said upper piston plate and are adapted to be secured to the pipe being supported. The lower plate is affixed to the assembled hanger assembly by means of a plurality of fingers engaging bayonet slots in the lower end portion of the housing. The lower plate has a plurality of partial annular grooves into which a tool may be inserted to compress the spring and allow the fingers to be turned within the bayonet slot in the well-known fashion. Upon removal of the tools the fingers engage the blind slot of the bayonet slot in the well-known fashion.

4 Claims, 5 Drawing Figures

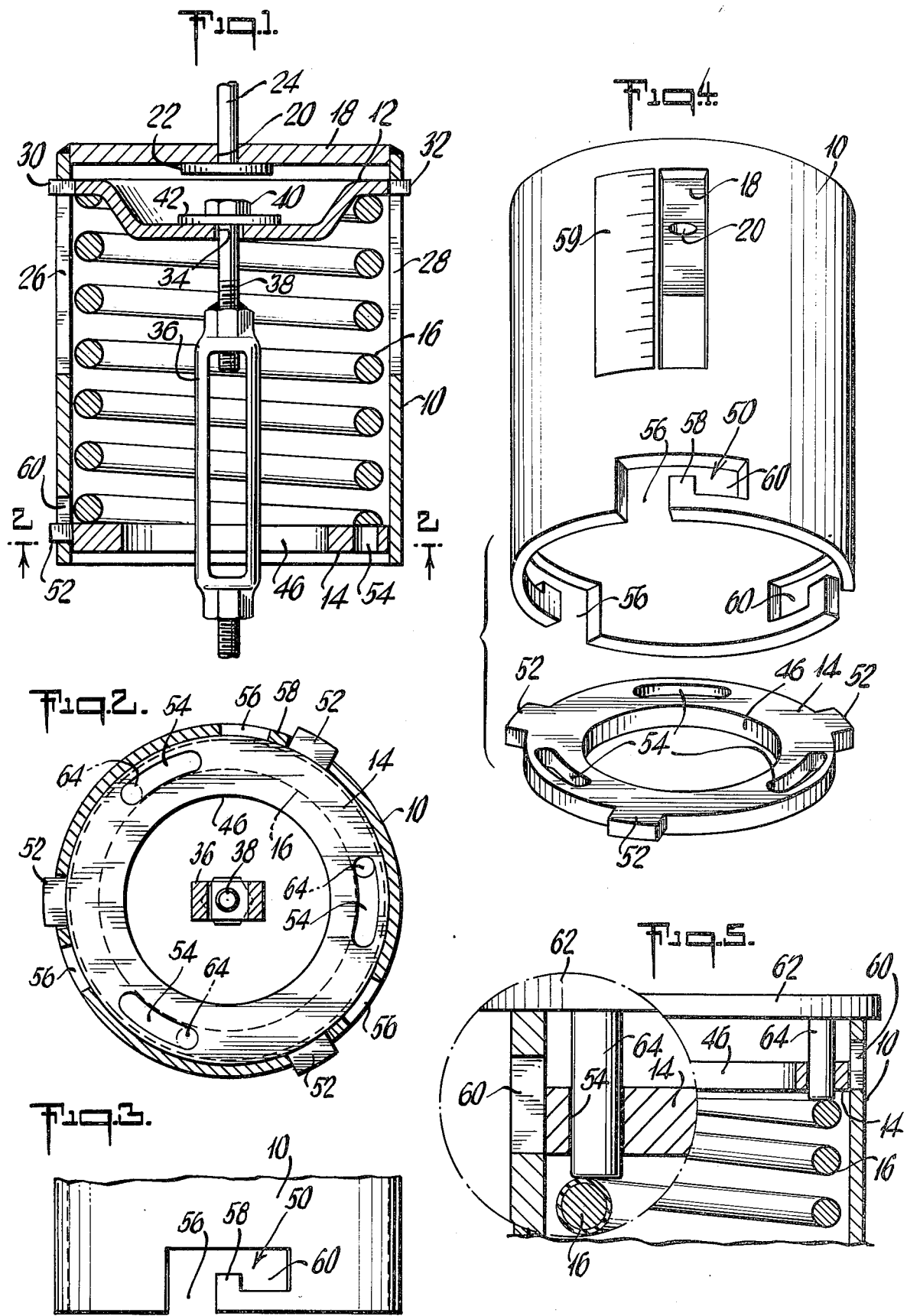

VARIABLE SPRING HANGER ASSEMBLY

BACKGROUND OF THE INVENTION

The present invention relates to improvements in pipe line suspension means, and in particular to a new and improved spring-loaded hanger assembly for supporting a section of a pipe line.

Where long pipe lines are supported along their lengths from an overhead support, they are subjected to large variations in temperature through the fluid flowing therethrough, as well as external influences which cause the pipe to elongate or contract, sway, sag or otherwise move relative to the supporting structure. Such movement is dangerous, in that it tends to impose an undue strain on the pipe line, particularly where fixed and rigid supports are provided. Consequently, it is customary to provide spring-loaded support structures including an internal spring which is adapted to resist vertical movement of the supported pipe, or in extreme cases to adjust the position of the supporting structure to compensate for deflection or movement of the pipe with a cushioning action.

In conventional pipe hangers of the aforementioned type, an upper plate is slidably mounted within a housing and a coiled compression spring is seated at its upper end on the upper plate, and at its lower end is seated upon a bottom plate which is secured to the bottom end of the casing by welding or by bolting. Since such pipe hangers are being used to support pipe lines in a corrosive atmosphere to an increasing extent, it is desirable to coat the compression spring with a protective coating and to galvanize the metal housing, as well as all the other parts, in order to protect these parts from corrosion or other damage due to environmental conditions. However, when the bottom plate is welded to the housing as the final step in assembling the hanger unit, the heat of the welding operation melts the protective coating on the spring portion adjacent the weld, and further destroys the galvanizing on the adjacent surfaces on the housing. In addition, many of the finished housings contain springs of different strengths and cross-sections, and one housing may hold a variety of different springs. Furthermore, if the bottom plate is bolted on, additional materials and additional assembly steps are required. In addition, the plate and the housing require opposed annular shoulders to accommodate the bolts and nuts.

An object of the present invention is to overcome the aforementioned difficulty by providing an improved variable spring hanger assembly in which the bottom plate is not welded to the housing and therefore the unit is not subjected to such heat as to adversely affect the spring coating or the housing wall galvanization.

Another object of the invention is the provision of a spring hanger assembly of the character described in which the bottom or lower plate is securely mounted in positions by means of fingers extending outwardly from the circumference thereof engaging bayonet slots in the lower end portion of the housing.

Still another object of the invention is the provision of a spring hanger assembly of the character described which is of a simple construction which renders it more easy to coat and to galvanize, the assembly being economical to manufacture.

Yet a further object of the invention is to provide a series of partial annular grooves within the bottom plate to allow insertion of the tool further compressing the spring and allowing easy rotation of the lower plate into engagement with the blind slot of the bayonet slot.

A further object of the invention is the provision of a spring hanger assembly of the character described which may be assembled in an extremely easy and rapid operation, and in which the housing is so arranged that it may be used interchangeably to contain springs of various sizes and shapes, so that only one type of housing need be stocked in inventory.

SUMMARY OF THE INVENTION

In accordance with the present invention there is provided a variable spring hanger assembly for hanging pipe lines, comprising a hollow housing, an upper piston plate slidably mounted within the upper portion of the housing for vertical movement therein, a lower plate, spring means interposed between said upper and lower plates for urging the upper piston plate upwardly away from the lower plate, and means for mounting the lower plate immovably within the lower end of said housing. The mounting means comprises a plurality of fingers extending outwardly from the circumference of the lower plate engaging bayonet slots located in the lower end portion of said housing.

Additional objects and advantages of the invention will become apparent during the course of the following specification when taken in connection with the accompanying drawings.

DESCRIPTION OF THE DRAWING

FIG. 1 is a central longitudinal sectional view of a spring hanger assembly made in accordance with the present invention;

FIG. 2 is a cross-sectional view taken along the line 2—2 of FIG. 1;

FIG. 3 is a fragmented side elevation view of the lower end portion of the housing;

FIG. 4 is a partially exploded perspective view of the housing and lower plate of FIG. 1; and FIG. 5 is an inverted sectional view of the lower end portion of FIG. 1 with parts removed, and showing insertion of a tool in the groove on the right-hand portion of the figure, and showing an enlarged fragmentary detail of the tool further compressing the spring in the left-hand portion thereof.

DESCRIPTION OF THE PREFERRED EMBODIMENT

Referring in detail to the drawing, there is shown in FIGS. 1 and 2 a variable spring hanger assembly made in accordance with the present invention. The assembly includes a tubular housing 10 of a circular cross-section within which is mounted an upper piston plate 12, a lower plate 14 and a coiled compression spring 16 seated between said two plates 12 and 14.

The hollow housing 10 has a fixed top wall 18 which is welded thereto before assembly of the unit and before the housing and top wall are galvanized. The top wall 18 has a central tapped aperture 20 passing through a reinforcing plate 22 adapted to receive the threaded end of a support rod 24 which is secured to an overhead support. The housing 10 is therefore rigidly mounted and cannot move in a vertical direction.

The lower end of the housing 10 is initially open, but during assembly of the unit the lower plate 14 is mounted therein in a manner which will be presently described. The side wall of the housing is provided with a pair of diametrically-opposed vertical slots 26 and 28 extending longitudinally along the housing for a portion of its length.

The upper piston plate 12 is circular and has an outer diamter slightly smaller than the inner diameter of housing 10 so that it is vertically slidable within the housing. For purposes of structural rigidity, the plate 12 may be formed in the dish shape, as shown in FIG. 1. The piston plate 12 is also formed with a pair of diametrically-opposed projecting tabs 30 and 32 which extend slidably through the respective slots 26 and 28. An aperture 34 is provided centrally in the plate 12.

The upper piston plate 12 supports a turnbuckle 36 to which is welded a threaded upper bolt 38, the shank of which extends loosely through the central aperture 34 of plate 12. The bolt head 40 overlies a washer 42 surrounding said aperture 34. The turnbuckle 36 also has a threaded lower support rod 44 which is connected to a collar or clamp (not shown) attached to the pipe to be supported by the spring hanger assembly. The turnbuckle 36 extends through an enlarged aperture 46 in the lower plate 14 and projects below the lower end of housing 10 so that its lower end is exposed for ready and convenient adjustment.

Since pipe line suspension assemblies are now commonly used either out of doors where they are subjected to moisture and other adverse atmospheric conditions, or in artifically induced emvironments, either in or out of doors, the compression spring 16 is coated with a protective coating, such as vinyl plastic, fluorocarbon, polyamide urethane, or rubber, and the walls of housing 10 are galvanized to make these parts corrosion-resistant. As previously described, in spring hanger assemblies of this type, the lower plate is normally secured to the bottom of the housing by welding after the housing unit is assembled with the compression spring therein. The heat of such welding operation melts the protective coating on the adjacent portion of the compression spring and destroys the galvanized finish on the housing, thus adversely affecting the corrosion-resistance of these parts. Furthermore, in older constructions the lower plate is bolted on through apertures in annular extensions of the plate and housing, adding to the physical volume and weight of the unit.

In accordance with the present invention, the necessity for welding or bolting the lower plate is eliminated by use of fingers extending outwardly from the circumference of the lower plate 14 and engaging bayonet slots in the lower end portion of the housing. For this purpose, the length of the tubular housing 10 may be made longer than normal, by extending the lower end portion thereof and in this extended lower end portion a plurality of bayonet slots 50 are formed for receiving the fingers 52 of the lower plate.

The lower plate is shown in the preferred embodiment as having three fingers located at approximately 120° along the circumference of the plate 14. The fingers tend to extend outwardly of the housing primarily for psychological reasons in order to demonstrate to the user a more positive attachment.

Located inwardly of the outer circumference are a plurality of abbreviated annular openings 54 having an inner circumferential length for the purpose hereinafter appearing. The openings lie along a circumference in registry with the major circumferential diameter of the spring 16.

The bayonet slots 50 are formed in the usual manner and consist of an open slot 56 and a post portion 58 and a blind slot 60, the length of the slots 56,60 and the length of the post 58 is approximately equal to the annular length of the openings 54.

The assembly operation should now become apparent and references had to FIG. 5 in which the housing assembly is shown in reversed position. A tool which may consist, for example of a plate 62 of a greater diameter than the outer diameter of the housing and carrying three posts 64 positioned approximately 120° along an inner circumference of the plate 62, this circumference being in registry with the groove 54 and the major diametric circumference of the spring 16. The posts are inserted within the openings 54 at one end thereof. The tool is then pressed inwardly until it engages and abuts the lower most end of the housing (as seen in FIG. 5). The posts pass through the openings at one end thereof and further compress the springs away from the lower surface of the bottom plate. While in this condition it is very simple to just rotate the plate so that it travels a distance equal to the length to the grooves 54. In this condition the fingers which initially pass in through the open slot 56, pass the post 58 and move into position within the blind slot 60. The tool is then removed and the spring abuts the inner surface of the lower plate, firmly wedging the fingers in the blind slot 60. This position is illustrated in FIG. 2 of the drawings, which shows the posts 64 just prior to their removal from the assembly.

When an intermediate portion of a long pipe line is supported by the lower support rod 44 of the turnbuckle 36, the pipe is subject to considerable expansion and contraction due to temperature variations in the surrounding atmosphere or of fluids flowing through the pipe. In addition, external forces may cause the pipe line to sway or move in a lateral direction. Because of the loose fit of the bolt 38 within the upper plate aperture 34, the turnbuckle 36 may tilt to permit limited longitudinal and lateral movement of the supported pipe. On the other hand, downward movement or sagging of the portion of the pipe line supported by the variable spring hanger assembly is resisted by compression of the compression spring 16.

In the assembled condition of the unit shown in FIG. 1, the coil spring 16 is slightly compressed between the upper piston plate 12 and the lower plate 14, the tension of said spring 16 urging the piston plate 12 in an upward direction. The tabs 30 and 32 on the upper piston plate 12 project through the respective slots 26 and 28, and are biased into engagement with the top of said slots by compression spring 16. When a pipe is suspended from the turnbuckle lower support rod 44, the weight of the pipe is transmitted through the turnbuckle 36 and applied to the upper piston plate 12, tending to depress the latter and thereby slightly compressing the coil spring 16. The turnbuckle 36 may be adjusted to conform to the level of the suspended pipe section, so that the spring hanger assembly normally exerts a slight upward pull on the pipe section.

If, during operation of the pipe line, the section of pipe supported by the spring hanger assembly tends to move vertically in a downward direction, the spring 16 acts to resist such downward movement. However, if the force of such movement is greater than the strength of spring 16, the spring will compress, and the upper piston plate 12 will move downwardly within the housing 10. The tabs 30 and 32 move downwardly within the respective slots 26 and 28 and cooperate with one or more calibrated scales 59 (FIG. 4) located adjacent either or both slots 26, 28, the tabs acting as indicators to provide a visual indication of the degree to which the piston plate 12 has been lowered.

It is obvious that the purpose of the tooling to further compress the spring is to greatly simplify the assembly procedure. Because of the coating on the spring the normal forces required to twist the lower plate, were the spring to abut the lower plate during this rotational procedure would be extremely high. By use of this tool these frictional forces are reduced to a very negligible amount.

While a preferred embodiment of the invention has been shown and described herein, it is obvious that numerous omissions, changes and additions may be made in such embodiment without departing from the spirit and scope of the invention.

We claim:

1. A variable spring hanger assembly for supporting a pipe, comprising:
   a hollow housing having a lower end portion, said housing having at least two bayonet slot openings defined in said lower end portion,
   an upper piston plate slidably mounted within the upper portion of the housing for vertical movement therein,
   a lower plate, said plate having at least two fragmented annular openings defined therein spaced from the outer circumference of said plate,
   spring means interposed between said upper and lower plates for urging said upper piston plate upwardly away from said lower plate,
   and means mounting said lower plate immovably within the lower end of said housing,
   said mounting means comprising at least two fingers extending outwardly from said lower plate, and engaging said bayonet slot openings defined in the lower end portion of said housing, the length of said annular openings being approximately equal to the horizontal length of said bayonet slots and in alignment with the major circumferential diameter of said spring means.

2. A variable spring hanger assembly for supporting a pipe, comprising:
   a hollow housing having a lower end portion, said housing having at least two bayonet slot openings defined in said lower end portion, each opening having a blind slot defined therein,
   an upper piston plate slidaby mounted within the upper portion of the housing for vertical movement therein,
   a lower plate,
   spring means interposed between said upper and lower plates for urging said upper piston plate upwardly away from said lower plate,
   means mounting said lower plate immovably within the lower end of said housing,
   said mounting means comprising at least two fingers extending outwardly from said lower plate, and engaging an opening defined in the lower end portion of said housing, and said plate having at least two elongated annular openings at least as long as the horizontal length of said bayonet slot and defined therein, and spaced from the outer circumference of said plate.

3. In the method of assembling a variable hanger assembly in which a spring is inserted against an upper piston plate secured to a housing, and a lower plate is secured against a spring, the improvement comprising providing at least two fingers on the lower plate and providing two complimentary bayonet slots having defined therein an open slot and a blind slot, in the lower end of the housing, further providing fragmented annular openings spaced inwardly from the circumference of the lower plate and in substantial alignment with the spring, introducing means through said openings, to force the spring inwardly within the housing, and sufficiently so that when the plate is completely within the open slot, the spring still does not abut the plate, rotating the plate so that the fingers move from the open slot to the blind slot of the bayonet slots, removing the force means so that the spring moves into contact with the lower plate, said plate fingers engaging said blind slot.

4. The method of assembling the hanger of claim 3, wherein said forcing means includes a tool having a series of posts adapted to pass through said openings.

* * * * *